UNITED STATES PATENT OFFICE.

EDUARD ULLRICH, OF HÖCHST-ON-THE-MAIN, GERMANY, ASSIGNOR TO THE FARBWERKE, VORMALS MEISTER, LUCIUS & BRÜNING, OF SAME PLACE.

BLUE COLORING-MATTER FORMED BY THE ACTION OF PARANITROSO-DIPHENYLAMINES ON PHENOLS OR OXYCARBONIC ACIDS.

SPECIFICATION forming part of Letters Patent No. 366,356, dated July 12, 1887.

Application filed February 4, 1887. Serial No. 226,597. (No specimens.)

*To all whom it may concern:*

Be it known that I, EDUARD ULLRICH, doctor of philosophy, a citizen of the Empire of Germany, residing at Höchst-on-the-Main, in the Empire of Germany, have invented certain new and useful Improvements in Blue Coloring-Matter; and I do hereby declare the following to be a full, clear, and exact description of the invention, such as will enable others skilled in the art to which it appertains to make and use the same.

This invention relates to the manufacture of blue coloring-matter or dye-stuff by the action of paranitroso diphenylamine on phenols or oxycarbonic acids.

In carrying out my invention I proceed as follows: The paranitroso-diphenylamine

is prepared from diphenylnitrosamine

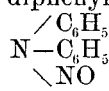

by treatment of the same with alcoholic hydrochloric acid. To five parts of the chlorhydrate of paranitroso-diphenylamine and eight parts of gallic acid are added fifty parts of acetic acid (of twenty per cent.) and heated in a water bath until the mass has taken a blue coloring. Now the product is poured into cold water, the blue coloring-matter, which has separated, filtered off and washed with water.

The coloring-matter is in form of a dark-blue paste. It is insoluble in cold water, soluble with difficulty in hot water. In dyeing, as well as in printing, it is fixed on the fiber by means of chrome or iron mordants, with the addition of acetate of lime.

What I claim as new, and desire to secure by Letters Patent, is—

As a new manufacture, the blue coloring-matter or dye-stuff produced by the action of paranitroso-diphenylamine on phenols or oxycarbonic acids, substantially as described.

In testimony whereof I affix my signature in presence of two witnesses.

EDUARD ULLRICH.

Witnesses:
ALVESTO S. HOGUE,
JEAN GRUND.